United States Patent
Xu et al.

(10) Patent No.: US 11,351,924 B2
(45) Date of Patent: Jun. 7, 2022

(54) ARMREST BOX ASSEMBLY

(71) Applicant: Ford Global Technologies, LLC, Dearborn, MI (US)

(72) Inventors: Yin Xu, Nanjing (CN); Chongyang Lu, Nanjing (CN); Fan Jin, Nanjing (CN); Jing Wen, Nanjing (CN); Yinhua Zhou, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/661,057

(22) Filed: Oct. 23, 2019

(65) Prior Publication Data
US 2020/0189434 A1 Jun. 18, 2020

(30) Foreign Application Priority Data
Dec. 12, 2018 (CN) .......................... 201811517154.2

(51) Int. Cl.
| | | |
|---|---|---|
| *B60R 7/04* | (2006.01) | |
| *B60N 2/75* | (2018.01) | |
| *E05F 15/70* | (2015.01) | |
| *B60R 16/037* | (2006.01) | |

(52) U.S. Cl.
CPC ............... *B60R 7/04* (2013.01); *B60N 2/793* (2018.02); *B60R 16/0373* (2013.01); *E05F 15/70* (2015.01); *E05Y 2400/44* (2013.01); *E05Y 2900/538* (2013.01)

(58) Field of Classification Search
CPC ............ B60N 2/793; B60N 2/797; B60R 7/04
USPC ............................................ 296/24.34, 37.8
See application file for complete search history.

(56) References Cited

U.S. PATENT DOCUMENTS

| | | | |
|---|---|---|---|
| 5,562,331 A | 10/1996 | Spykerman et al. | |
| 6,168,059 B1 * | 1/2001 | Salenbauch | B60R 7/04 220/345.5 |
| 6,616,205 B2 * | 9/2003 | Bruhnke | B60R 7/04 296/37.8 |
| 7,029,048 B1 * | 4/2006 | Hicks | B60N 3/101 296/193.04 |
| 7,264,291 B2 | 9/2007 | Radu et al. | |
| 7,770,954 B2 | 8/2010 | D'Alessandro | |

(Continued)

FOREIGN PATENT DOCUMENTS

| | | |
|---|---|---|
| CN | 107031515 A | 8/2017 |
| JP | 2013220711 A | 10/2013 |

OTHER PUBLICATIONS

YouTube, 2013 Ram 1500: Center Console Storage, Published on Apr. 10, 2012, FCA North America, 3 pages.

*Primary Examiner* — Kyle J. Walraed-Sullivan
(74) *Attorney, Agent, or Firm* — Vichit Chea; Price Heneveld LLP

(57) ABSTRACT

An armrest storage box assembly has an armrest box body comprising a first storage space having a first opening, and an armrest connected to the armrest box body, the armrest moving between a first closed position and a first open position to open and close the first opening. The armrest comprises an armrest body, comprising a second storage space having a second opening, and a cover connected to the armrest body, the cover moving between a second closed position at which the second opening is closed and a second open position at which the second opening is opened to open and close the second opening.

6 Claims, 6 Drawing Sheets

(56) References Cited

U.S. PATENT DOCUMENTS

| | | |
|---|---|---|
| 8,196,985 B2 | 6/2012 | Penner et al. |
| 2001/0020620 A1* | 9/2001 | Katagiri .................... B60R 7/04 |
| | | 220/345.2 |
| 2002/0089217 A1* | 7/2002 | Scheerhorn ............... B60R 7/04 |
| | | 297/188.19 |
| 2004/0189797 A1* | 9/2004 | Todd ................... B60R 11/0211 |
| | | 348/61 |
| 2007/0024025 A1* | 2/2007 | Hopper .............. B62D 25/2072 |
| | | 280/414.1 |
| 2008/0079278 A1* | 4/2008 | Rajappa .................... B60R 7/04 |
| | | 296/24.34 |
| 2009/0058120 A1 | 3/2009 | Ioka et al. |
| 2009/0072565 A1* | 3/2009 | Mayne, Jr. ................ B60R 7/04 |
| | | 296/24.34 |
| 2009/0146444 A1* | 6/2009 | Ichimaru .................. B60R 7/04 |
| | | 296/37.8 |
| 2011/0199182 A1* | 8/2011 | Catlin .................... B60N 3/106 |
| | | 340/5.7 |
| 2014/0306477 A1 | 10/2014 | Neugebauer et al. |
| 2015/0197201 A1* | 7/2015 | Greiner .................... B60R 7/08 |
| | | 296/24.34 |
| 2016/0304030 A1* | 10/2016 | Rienecker ............... B60R 11/04 |
| 2016/0339847 A1* | 11/2016 | Kodama .................... B60R 7/04 |
| 2017/0291733 A1* | 10/2017 | Henderson ......... B65D 11/1873 |
| 2019/0375335 A1* | 12/2019 | Suzuki ...................... B60R 7/04 |

* cited by examiner

ARMREST BOX ASSEMBLY

FIELD OF THE DISCLOSURE

The present disclosure generally relates to an armrest storage box assembly, such as for use on a vehicle.

BACKGROUND OF THE DISCLOSURE

A vehicle typically has a space and a storage device for passengers to place items. For example, an armrest storage box or storage assembly is usually located between vehicle seats has storage space for storing items carried by a driver or a passenger. Items carried by the driver or the passenger can also be placed elsewhere, for example, larger items can be placed on vacant seats and on the floor of the vehicle. However, passengers may still find it inconvenient to store items such as mobile phones, coins, handbags, and paper napkins. Therefore, a need to improve the armrest storage box for convenient and orderly storage of commonly used items exists.

SUMMARY OF THE DISCLOSURE

An armrest box assembly is provided in accordance with an aspect of the present disclosure. The armrest box assembly includes an armrest box body comprising a first storage space having a first opening, and an armrest connected to the armrest box body, the armrest moving between a first closed position and a first open position so as to open and close the first opening. The armrest comprises an armrest body, comprising a second storage space having a second opening, and a cover connected to the armrest body, the cover moving between a second closed position and a second open position so as to open and close the second opening.

In one embodiment, the armrest box body is provided with a guide rail around at least one longitudinal wall of the first opening, the armrest comprising a slider slidingly connected to the guide rail, the armrest sliding on the guide rail to open or close the first opening.

In another embodiment, the armrest box assembly further comprises a hinge structure, the hinge structure comprising a first hinge part connected to a rear wall of the armrest box body and a second hinge part connected to a rear portion of the armrest, wherein the armrest pivotally opens or closes the first opening between the first closed position and the first open position.

In another embodiment, the cover further comprises a slot in communication with the second opening.

In another embodiment, the cover comprises a first cover body and a second cover body connected to both sides of the armrest body to facilitate pivoting between the second closed position and the second open position, wherein the first cover body and the second cover body collectively forming a slot at the second closed position.

In another embodiment, the cover comprises the first cover body and the second cover body connected to both sides of the armrest box body to facilitate pivoting between the second closed position and the second open position, wherein the first cover comprises a first recess on a first side opposite to a first pivoting edge and the second cover comprises a second recess on a second side opposite to a second pivoting edge, the first recess and the second recess collectively forming a slot in communication with the second opening at the second closed position of the cover.

In another embodiment, the armrest body comprises a first side wall, a second side wall opposite to the first side wall, a front wall connected to the first side wall and the second side wall, a rear wall connected to the first side wall and the second side wall and opposite to the front wall, and a bottom wall connected to the first side wall, the second side wall, the front wall, and the rear wall, the first side wall, the second side wall, the front wall, the rear wall, and the bottom wall collectively forming the second storage space.

In another embodiment, the armrest further comprises a biasing element disposed in the second storage space to bias an item located in the second storage space toward the slotting direction, the biasing element comprising a first biasing element disposed on the first side wall and a second biasing element located on the second side wall. In one embodiment, the first and second biasing elements are rubber strips.

In another embodiment, the armrest box assembly further comprises a switch and a motor for driving the armrest, the motor driving the armrest to move when the switch is activated.

In another embodiment, the armrest box body is sized to accommodate a handbag or a laptop.

According to another aspect of the present disclosure, an armrest box assembly for a vehicle is provided, the armrest box assembly being disposed between two vehicle seats. The armrest box assembly comprises: an armrest box body comprising a first storage space having a first opening, an armrest connected to the armrest box body, and a motor for driving the armrest to move relative to the armrest box body. The armrest is movable relative to the armrest box body so as to open and close the first opening. The armrest comprises: an armrest body comprising a second storage space having a second opening, and a cover connected to the armrest body, the cover being movable relative to the armrest body so as to open and close the second opening.

In one embodiment, the armrest box body comprises a first side wall extending in a longitudinal direction of the vehicle, a second side wall opposite to the first side wall, a front wall adjacent to the front portion of the vehicle, and a rear wall opposite to the front wall, one of the first and second side walls is provided with a guide rail, the armrest comprising a slider slidingly connected to the guide rail, and the armrest is slidable from a first closed position of the first opening toward a rear portion of the vehicle to expose the first opening until the armrest slides to the first open position.

In another embodiment, the armrest box body comprises a first side wall extending in a longitudinal direction of the vehicle, a second side wall opposite to the first side wall, a front wall adjacent to the front portion of the vehicle, and a rear wall opposite to the front wall, the armrest box assembly further comprises a hinge structure, the hinge structure comprising a first hinge part connected to a rear wall of the armrest box body and a second hinge part connected to a rear portion of the armrest, wherein the armrest is pivotable between a first closed position and a first open position.

In another embodiment, the armrest body comprises a first side wall, a second side wall opposite to the first side wall, a front wall connected to the first side wall and the second side wall, a rear wall connected to the first side wall and the second side wall and opposite to the front wall, and a bottom wall connected to the first side wall, the second side wall, the front wall, and the rear wall, the first side wall, the second side wall, the front wall, the rear wall, and the bottom wall collectively forming the second storage space.

In another embodiment, the armrest box assembly further comprises a switch connected to the motor, the motor driving the armrest to move when the switch is activated.

In another embodiment, the armrest box assembly further comprises a controller, the controller configured to activate the motor to move the armrest to a first open position in response to a camera within the vehicle detecting an image of an item carried by a front driver or a passenger. In one embodiment, the controller is further configured to activate the motor to move the armrest to the first closed position after a certain period of time. In one embodiment, the controller is further configured to activate the motor to move the armrest to a first open position in response to a signal indicating that the vehicle has reached a destination, or a signal indicating that the vehicle has parked.

In another embodiment, the armrest box assembly further comprises a controller, wherein the controller is further configured to move the armrest to the first open position or the first closed position in response to a voice command from the driver or the front passenger.

One or a plurality of features and/or advantages of the present disclosure will become apparent based on the following detailed description of one or a plurality of embodiments taken in conjunction with the accompanying drawings.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Specific embodiments of the present disclosure are disclosed herein as needed; however, it should be understood that the disclosed embodiments are merely examples of the present invention and can be implemented in various alternative forms. The drawings are not necessarily to scale, some features may be enlarged or reduced so as to show details of a particular component. Therefore, the specific structural and functional details disclosed herein should not be construed as limiting, but merely as a representative basis for teaching those skilled in the art to implement the present invention in various forms.

In a vehicle, an armrest storage box assembly is typically located between the vehicle seats and includes an armrest box body and an armrest box cover. The armrest box body includes a storage space for storing passenger items. The armrest box cover is for covering the storage space and support the driver's elbows. It is challenging to store commonly used items in the limited space of the armrest box and make them easily accessible to users. In some cases, the location of the storage space of the armrest box is inconvenient for the rear passenger to pick up items. Therefore, a need to provide additional space exists. The armrest box assembly of the present disclosure includes an armrest box body including a first storage space having a first opening, and an armrest connected to the armrest box body, the armrest moving between a first closed position and a first open position so as to open and close the first opening. The armrest includes an armrest body, including a second storage space having a second opening, and a cover connected to the armrest body, the cover moving between the second closed position and the second open position so as to open and close the second opening. The armrest box provides two independent storage spaces. The first storage space of the armrest box body may be provided to store larger items, and the second storage space on the armrest may be provided to store smaller items. An upper cover of the armrest is provided and can prevent small items from falling out while the vehicle is running. The armrest can also be configured to store paper napkins and the like for convenient access by front passengers or rear passengers.

Figure 1:
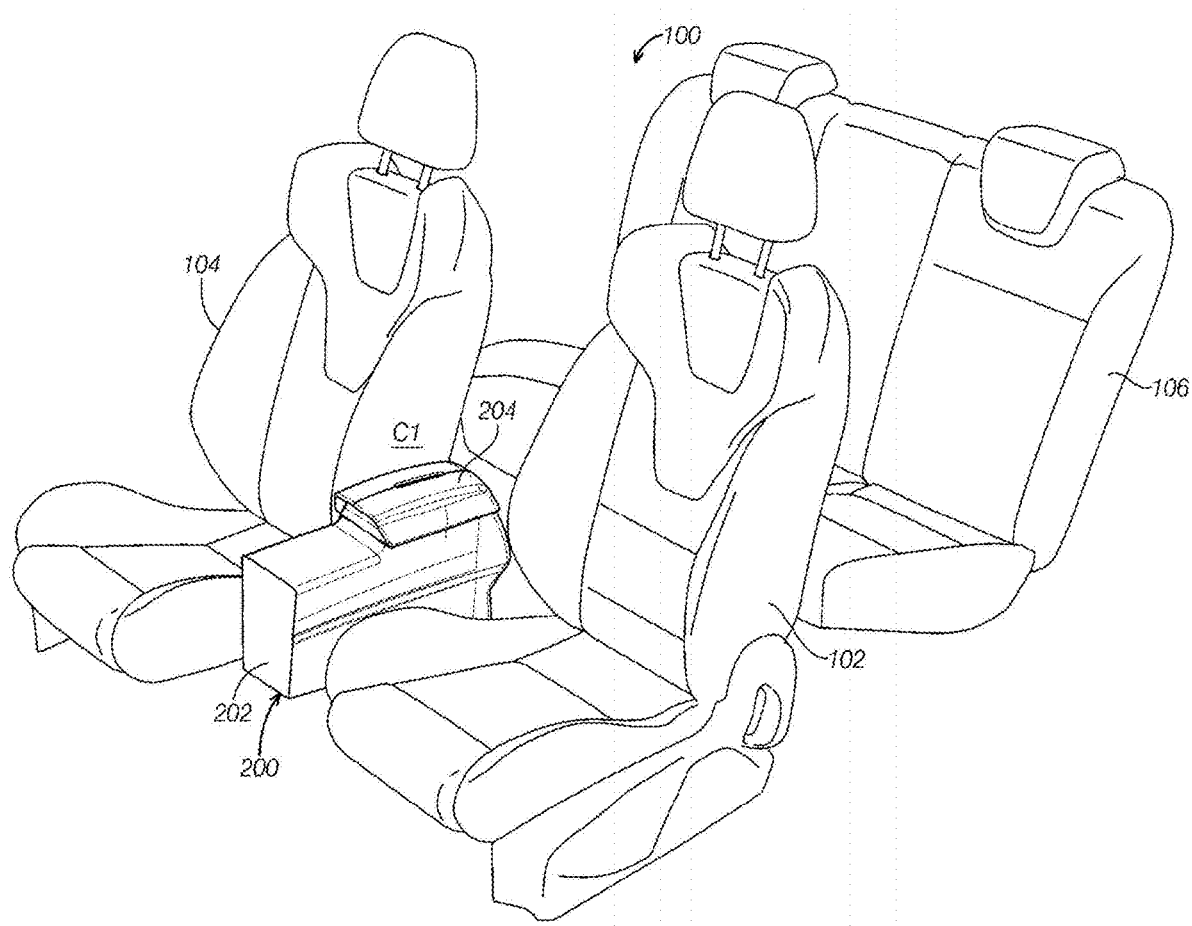
FIG. 1 is a partial schematic view of a vehicle, showing an armrest box assembly mounted between front seats of a vehicle in accordance with one exemplary embodiment of the present disclosure.

FIG. 1 shows a partial schematic view of a vehicle 100, showing an armrest box assembly 200, also referred to as an armrest storage box assembly, mounted within the vehicle 100 in accordance with one or a plurality of embodiments of the present invention. In one or a plurality of embodiments, the vehicle 100 includes a driver seat 102, a front passenger seat 104, and a rear passenger seat 106. The armrest box assembly 200 is located between the front seats 102 and 104 to provide storage space and to support the elbows of the front passenger or the driver. In one or a plurality of embodiments, the head of the vehicle is defined as front, and the tail of the vehicle is defined as rear. The armrest box assembly 200 includes an armrest box body 202 and an armrest 204 connected to the armrest box body 202.

Figure 2:
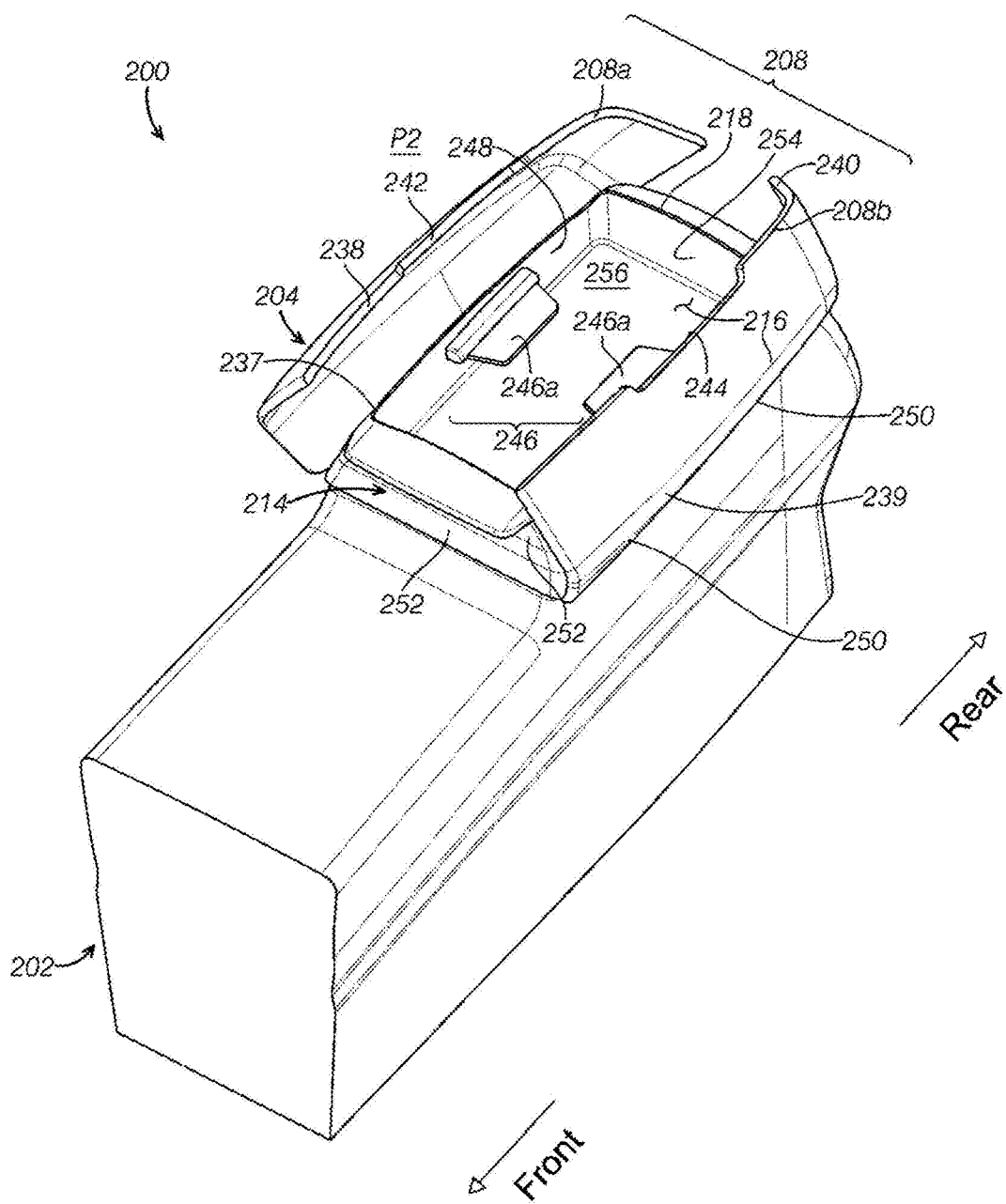
FIG. 2 is a perspective view of the armrest box assembly shown in FIG. 1, showing the cover of the armrest in an open position.
Figure 3:
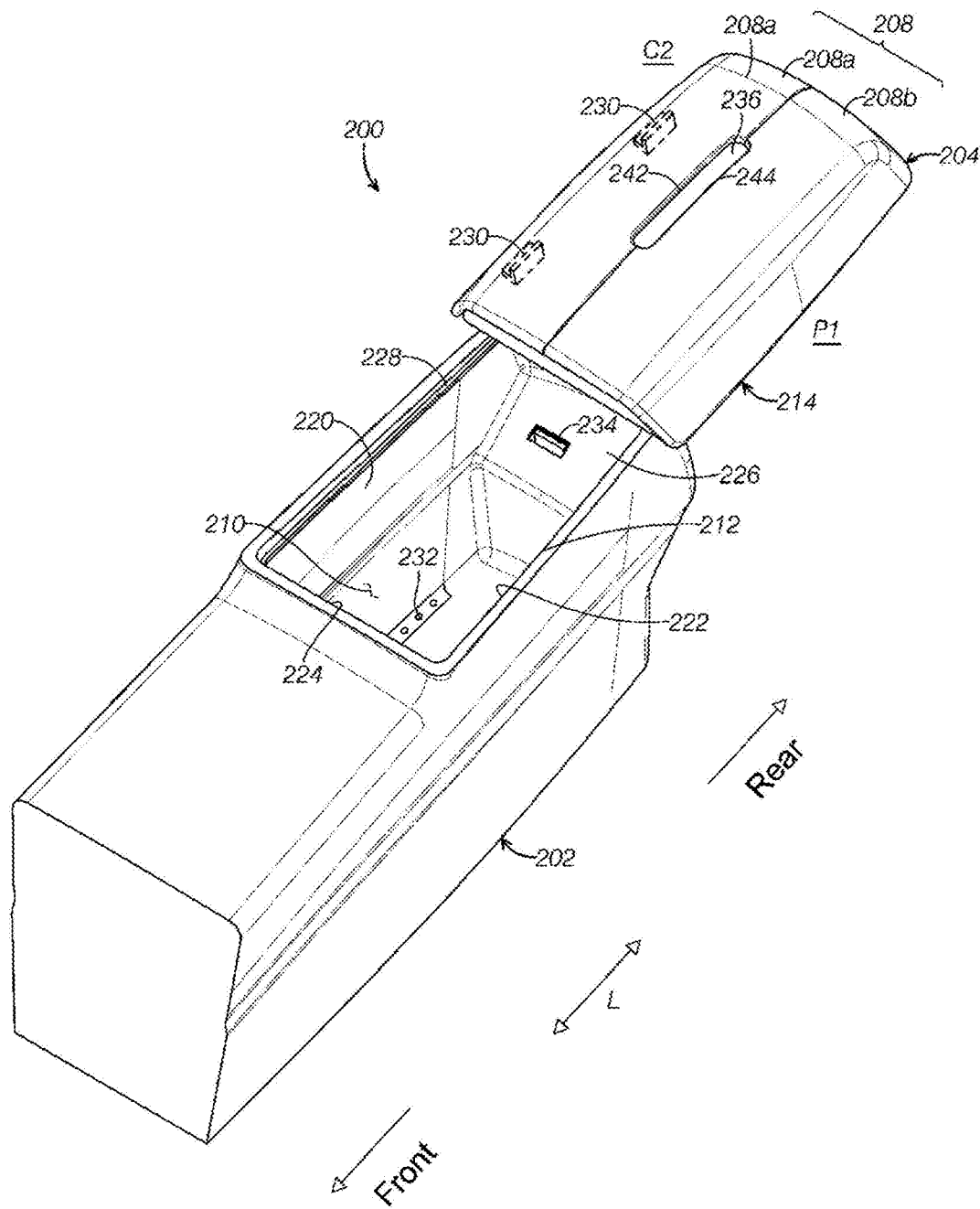
FIG. 3 is a perspective view of the armrest box assembly shown in FIG. 1, showing the armrest in an open position.

FIG. 2 illustrates a perspective view of the armrest box assembly 200 shown in FIG. 1, showing the cover 208 of the armrest 204 in an open position. In the present disclosure, the open position of the cover 208 is referred to as the second open position, and the closed position is referred to as the second closed position. FIG. 3 illustrates a perspective view of the armrest box assembly 200 shown in FIG. 1, showing the armrest 204 in an open position. In the present application, the open position of the armrest 204 is referred to as the first open position, and the closed position is referred to as the first closed position. In one or a plurality of embodiments, the armrest box assembly 200 includes: an armrest box body 202, including a first storage space 210 having a first opening 212, and an armrest 204 connected to the armrest box body 202. The armrest 204 is moved between a first closed position C1 as shown in FIG. 1 and a first open position P1 as shown in FIG. 3 so as to open and close the first opening 212. The armrest 204 includes an armrest body 214 including a second storage space 216 having a second opening 218, and a cover 208 connected to the armrest body, wherein the cover 208 is moved between a second closed position C2 at which the second opening 218 is closed as shown in FIG. 3 and a second open position P2 at which the second opening 218 is opened as shown in FIG. 2 so as to open and close the second opening 218. In one or a plurality of embodiments, the first storage space 210 of the armrest box body 202 is sized to accommodate relatively large items, such as a handbag or a laptop. For example, the volume of the first storage space 210 can be configured to be greater than 13.4 liters so as to accommodate handbags and laptops of different sizes. In one specific example, the length, width, and height of the first storage space 210 can be approximately 144 mm, 311 mm, and 300 mm, respectively. The second storage space 216 of the armrest body 214 is sized to accommodate small items, such as a mobile phone, a tissue box, and the like.

In one or a plurality of embodiments, the armrest box body 202 includes a first side wall 220 extending in the longitudinal direction L of the vehicle, a second side wall 222 opposite to the first side wall 220, a front wall 224 adjacent to the front portion of the vehicle, and a rear wall 226 opposite to the front wall. At least one of the first side wall 220 and the second side wall 222 is provided with a guide rail 228, the armrest 204 including at least one slider 230 slidingly connected to the guide rail 228. The armrest 204 slides on the guide rail 228 to open or close the first opening 212. Further, the armrest 204 slides from the first closed position C1 of the first opening 212 toward the rear to expose the first opening 212 until the armrest 204 slides to the first open position P1. When the armrest 204 slides to the first open position P1, the armrest 204 is closer to the rear seat 106 to facilitate the rear passenger picking up items from the second storage space 216 located in the armrest 204.

In one embodiment, the armrest box assembly 200 further includes a light emitting band 232, such as an LED light emitting band, located within the first storage space 210 of the armrest box body 202 to provide illumination when the armrest 204 slides to the first open position P1. In addition, the armrest box assembly 200 further includes various connector ports 234, such as USB ports, located within the first storage space 210 of the armrest box body 202 for convenient use by a user.

In one embodiment, the cover 208 includes a slot 236 in communication with the second opening 218. A user's finger can be extended into the slot 236 so as to open the cover 208. Certainly, in other embodiments, the opening and closing of the cover 208 can also be implemented by adopting a push-push switch. The slot 236 can also be provided as an opening for providing paper napkins, for example, and the paper napkins can be exposed through the slot 236 for convenient use by the passengers when a paper napkin box is placed in the second storage space 216. In one embodiment, the cover 208 can include a first cover 208a and a second cover 208b connected to both sides of the armrest body 214 to facilitate pivoting between a second closed position C2 and a second open position P2. The first cover body 208a is provided with a first recess 242 on a first side 238 opposite to the first pivoting edge 237, and the second cover body 208b is provided with a second recess 244 on a second side 240 opposite to the second pivoting edge 239, the first recess 242 of the first cover body 208a and the second recess 244 of the second cover body 208b collectively forming a slot 236 in communication with the second opening 218 at the second closed position C2.

In one embodiment, the armrest body 214 includes a first side wall 248, a second side wall 250 opposite to the first side wall 248, a front wall 252 connected to the first side wall 248 and the second side wall 250, a rear wall 254 connected to the first side wall 248 and the second side wall 250 and opposite to the front wall 2522, and a bottom wall 256 connected to the first side wall 248, the second side wall 250, the front wall 252, and the rear wall 254, the first side wall 248, the second side wall 250, the front wall 252, the rear wall 254, and the bottom wall 256 collectively forming the second storage space 216. The bottom wall 256 can be provided to cover the first opening 212 of the armrest box body 202.

In one embodiment, the armrest 204 further includes a biasing element 246 disposed within the second storage space 216 so as to bias an item located in the second storage space 216 toward the cover 208 to facilitate removal of items by a passenger. For example, a stack of paper napkins or a box of paper napkins can be raised via the biasing element 246 to facilitate access by a passenger from the storage space 216 or from the second slot 236. In one embodiment, the biasing element 246 can include a first biasing element 246a on the first side wall 248 of the armrest body 214 and a second biasing element 246b on the second side wall 250 of the armrest body 214. The pair of biasing elements 246a and 246b can not only position the item stored in the second storage space 216, but can also bias the item toward the slot 236 in the cover 208. In one embodiment, the first biasing element 246a and the second biasing element 246b can be resilient biasing elements such as rubber strips. The first biasing element 246a and the second biasing element 246b can also be integrally injection molded with the armrest body 214. It should be understood that in other embodiments, the biasing element 246 can also be other forms of resilient elements, such as resilient strips having both ends connected to the first side wall 246 of the armrest body 214 and the second side wall 248 of the armrest body 214, respectively.

In the embodiment shown in FIG. 3, the armrest 204 can slide to a position adjacent to the rear passenger and can make access to items in the armrest 204 convenient for the rear passenger.

Figure 4:
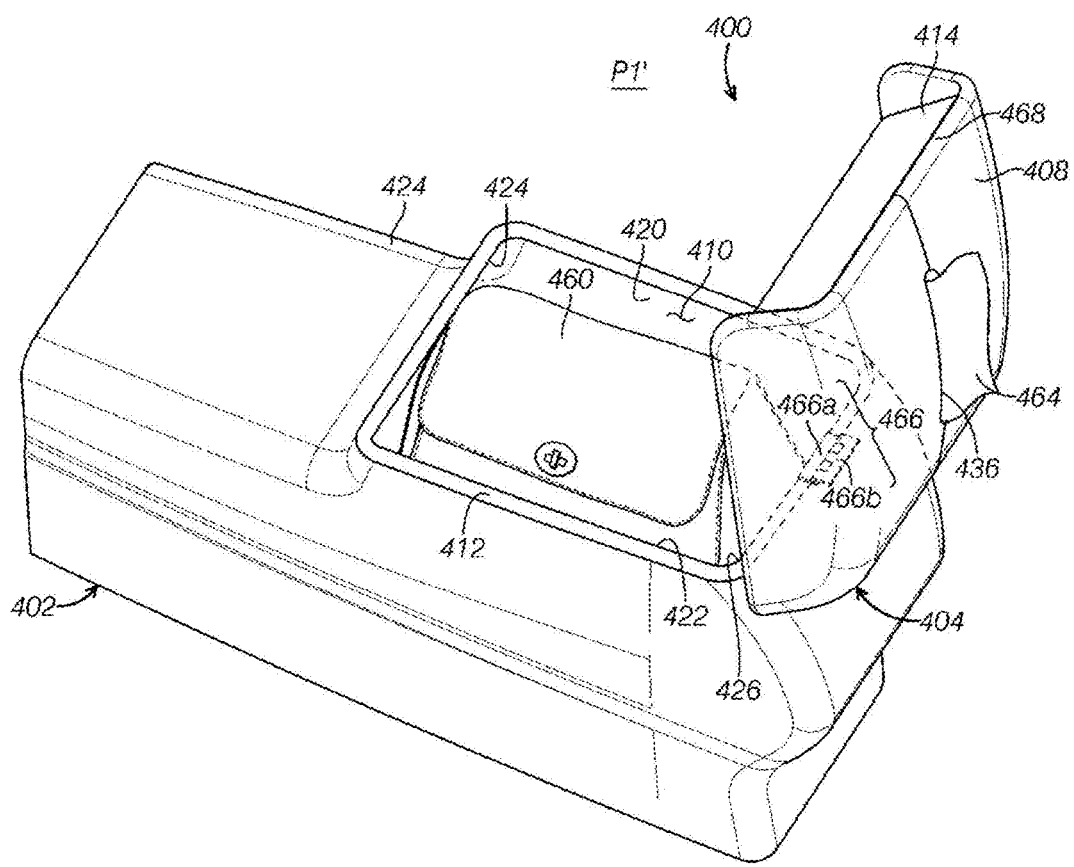
FIG. 4 is a perspective view of the armrest box assembly showing the armrest in an open position in accordance with another exemplary embodiment.

Referring to FIG. 4, a perspective view of an armrest box assembly 400 is illustrated showing the armrest 404 in an open position P1' in accordance with another exemplary embodiment of the present disclosure. In one embodiment, the armrest box assembly 400 is substantially similar to the armrest box assembly 200 shown in FIGS. 1 to 3. For the sake of brevity, only differences between the armrest box assembly 400 and the armrest box assembly 200 will be described in detail. The armrest box assembly 400 includes: an armrest box body 402, including a first storage space 410 having a first opening 412 and an armrest 404 connected to the armrest box body 402. The armrest 404 is moved between a first closed position and a first open position P1' so as to open and close the first opening 412. The armrest 404 includes an armrest body 414, including a second storage space having a second opening, and a cover 408 connected to the armrest body 414, wherein the cover 408 is moved between a second closed position at which the second opening is closed and a second open position at which the second opening is opened so as to open and close the second opening. In one embodiment, the first storage space 410 of the armrest box body 402 is sized to accommodate relatively large items, such as a handbag, a laptop, or the like. FIG. 4 shows a handbag 460 stored in the first storage space 410. The second storage space of the armrest body 414 is sized to accommodate relatively small items, such as a mobile phone, a paper napkin box, and the like. In one or a plurality of embodiments, the cover 408 includes a slot 436 in communication with the second opening. When a paper napkin box is placed in the second storage space, the paper napkin 464 can be exposed through the slot 436 for convenient access by the passenger.

In one or a plurality of embodiments, the armrest box body 402 includes a first side wall 420 extending in the longitudinal direction of the vehicle, a second side wall 422 opposite to the first side wall 420, a front wall 424 adjacent to the front portion of the vehicle, and a rear wall 426 opposite to the front wall. Unlike the armrest box assembly 200 shown in FIGS. 1 to 3, the armrest 404 is pivotally connected to the rear wall 426 of the armrest box body 402. In the embodiments shown in the illustrations, the armrest box assembly 400 further includes a hinge structure 466, the hinge structure 466 including a first hinge part 466a connected to a rear wall 426 of the armrest box body 402 and a second hinge part 466b connected to a rear portion of the armrest 404, wherein the armrest 404 pivots between the first closed position and the first open position P1'. When in the first open position P1', a free end 468 of the armrest 404 pivots toward the rear passenger, causing the slot 436 of the cover 408 to face the rear seat of the vehicle. When paper napkins are stored in the armrest 404, the rear passenger can easily draw the paper napkins 464 from the slot 436 of the armrest 404 located in the first open position P1'.

Figure 5:
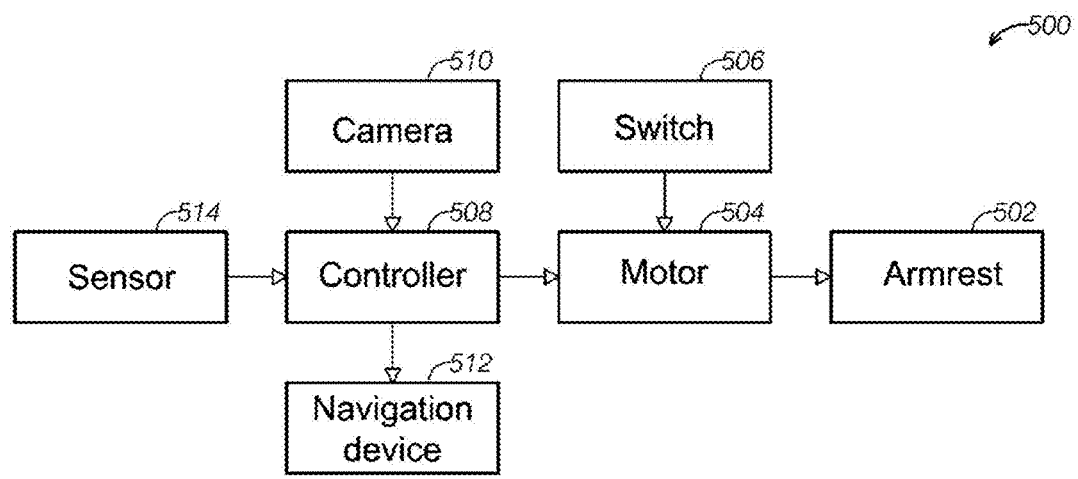
FIG. 5 is a system block diagram of the armrest box assembly in accordance with one embodiment.

Referring to FIG. 5, a system block diagram of an armrest box assembly 500 is illustrated in accordance with one embodiment of the present disclosure. The armrest 502 can be moved by a motor in response to activation of the switch 506 or a command from the passenger. In one embodiment, the armrest box assembly 500 includes a motor 504 for driving the armrest 502 to move relative to the armrest box body 202. Further, the armrest box assembly 500 includes a switch 506 connected to the motor 504. When the switch 506 is activated, the motor 504 drives the armrest 502 to move. For example, the armrest 502 slides along the armrest box body 202 in the longitudinal direction of the vehicle, or the armrest 502 rotates around one side of the armrest box body 402. In one embodiment, any suitable arrangement can be adopted for the motor 504 and the switch 506. For example, the motor 504 can be located on the armrest box bodies 202 and 402. In one embodiment, the switch 506 can be disposed at the front end of armrest 502 to facilitate operation by the driver or the front passenger. In another embodiment, the switch 506 can be provided at the rear end of the armrest 502 or the armrest boxes 202 and 402 to facilitate operation by the rear passenger. It should be understood that the motor 504 and the switch 506 can be provided at any suitable position.

In one embodiment, the armrest box assembly 500 further includes a controller 508 connected to the motor 504, a camera 510 connected to the controller 508, and a navigation device 512 and a sensor 514 that are connected to the controller 508. The controller 508 may be a conventional microcomputer, including, for example, a microprocessor unit, an input/output port, a read-only memory, a random access memory, a keep-alive memory, and a conventional data bus. The controller 508 may be configured using other analog and/or digital circuitry. In one embodiment, the controller 508 can be a dedicated controller for controlling the movement of the armrest 502. It should be understood that the controller 508 can be a shared controller such as part of a vehicle system controller (VSC). The camera 510 and the navigation device 512 can also be part of the vehicle system so that cost and system complexity can be effectively reduced without the need for additional devices to operate the armrest 502. The controller 508 is configured to receive signals from a plurality of sources to control the armrest 502, for example, but not limited to, a camera 510, a navigation device 512, and a sensor 514. In one or a plurality of examples, the sensor 514 can be a vehicle door sensor. Additionally, the controller 508 can also receive a voice signal from a microphone in the vehicle to operate the armrest 502.

Figure 6:
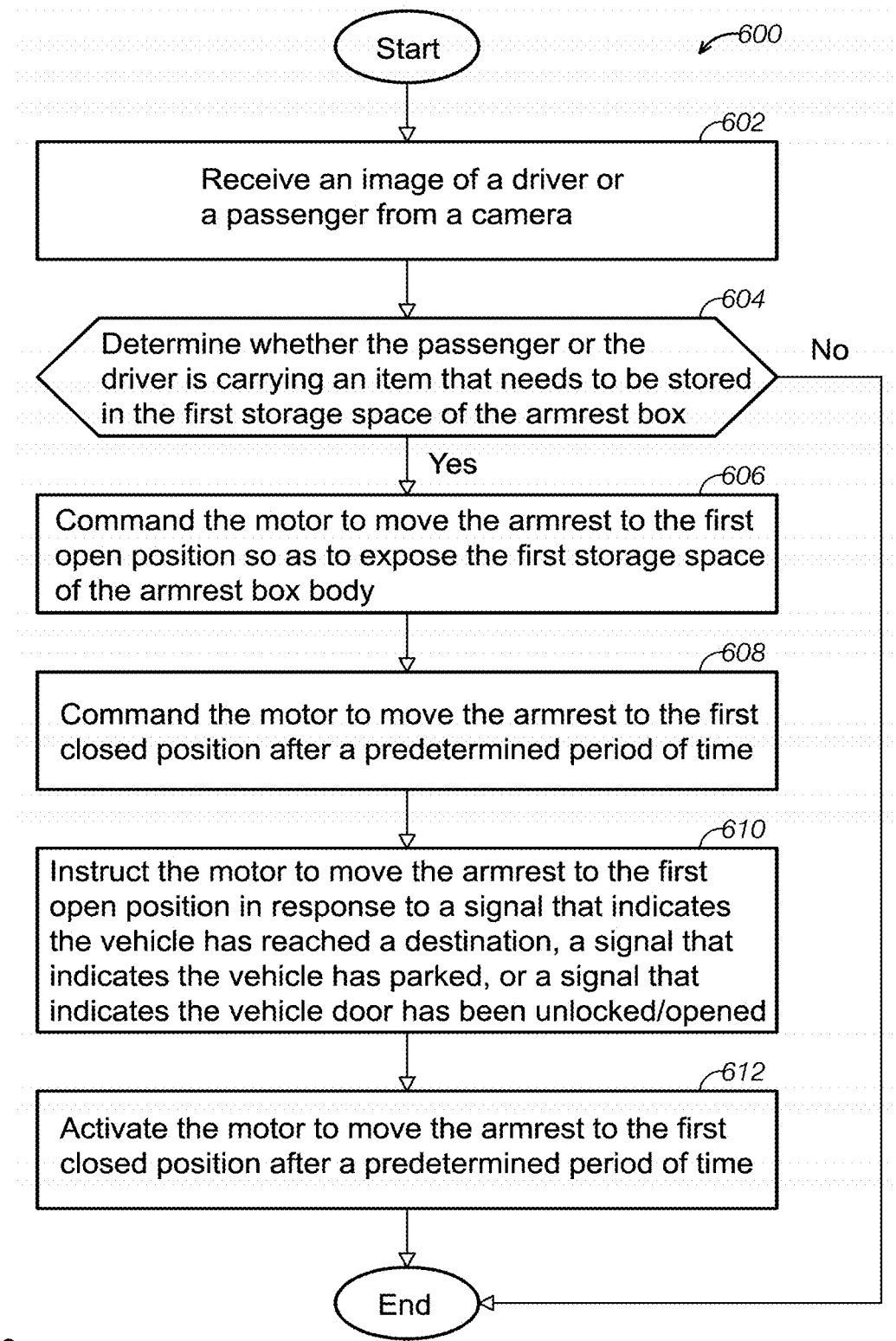
FIG. 6 is a control flow diagram of the armrest box assembly in accordance with one embodiment.

FIG. 6 is a flowchart of a method 600 for controlling the movement of the armrest box assembly 500 in accordance with one embodiment of the present disclosure. The method 600 can be executed by the controller 508. At step 602, the method 600 includes receiving an image of a driver or a passenger from the camera 510. The method 600 determines, at step 604 and based on the received image of the driver or the passenger, whether the passenger or the driver is carrying an item that needs to be stored in the first storage space of the armrest box. For example, the items may include, but are not limited to, handbags and laptops. It should be understood that in other embodiments, the controller 508 can receive other signals to determine whether the driver or the passenger needs to open the armrest to store items. For example, the controller 508 can receive door opening signals from the vehicle door sensor 514. In another embodiment, the controller 508 can receive a voice signal to open the armrest 502 from a vehicle microphone.

If the method 600 determines, at step 604, that the passenger or the driver is not carrying an item that needs to be stored in the first storage space of the armrest box, then the method 600 will end. If the method 600 determines, at step 604 that the passenger or driver is carrying an item that needs to be stored in the first storage space of the armrest box, then the method 600 will proceed to step 606. At step 606, the method 600 includes commanding the motor 504 to move the armrest 502 to the first open position to expose the first storage space of the armrest box body. Next, at step 608, in one embodiment, the method 600 includes commanding the motor 504 to move the armrest 502 to the first closed position after a predetermined period of time. In one embodiment, the predetermined period of time can be, for example, but not limited to, 10-20 seconds. It should be understood that in other embodiments, the method 600 can instruct the motor 504 to move the armrest 502 to the first closed position in response to other signals. For example, the controller 508 can command the motor 504 to move the armrest 502 to the first closed position in response to the door closing signals received from the vehicle door sensor 514. In another embodiment, the controller 508 can command the motor 504 to move the armrest 502 to the first closed position in response to a voice signal of closing the armrest 502 received from the vehicle microphone. Further, the controller 508 can further command the motor 504 to move the armrest 502 to the first closed position in response to a signal of vehicle movement.

Next, at step 610, the method 600 further includes instructing the motor to move the armrest 502 to the first open position in response to a signal of the vehicle arriving at the destination, a signal of the vehicle parking, or a signal of the vehicle door unlocking/opening, to facilitate removal of items from the first storage space by the driver or the passenger. For example, the controller 508 can receive a signal from the navigation device 512 that the vehicle has reached a destination. In another embodiment, the controller 508 can receive a signal from the vehicle system indicating that the vehicle has parked, such as a signal indicating that the vehicle is in the parking gear. In another embodiment, the controller 508 can receive a signal of the vehicle door unlocking or opening from the vehicle door sensor 514. It should be understood that, in other embodiments, the controller 508 can activate the motor 504 to move the armrest 502 to the first open position in response to a voice command received from the driver or the front passenger, to facilitate removal of items from the first storage space by the driver or the passenger.

At step 612, the method 600 includes activating the motor 504 after a predetermined period of time to move the armrest 502 to the first closed position. It should be understood that, in other embodiments, the controller 508 can move the armrest 502 to the first closed position in response to a voice command received from the driver or the front passenger, or receiving a signal of door locking. Thereafter, the method 600 proceeds to the end.

The armrest of the armrest box assembly of one embodiment of the present disclosure can be driven by a motor, such that the armrest of the armrest box assembly can be automatically opened or closed based on relevant signals.

What is described above are only preferred embodiments of the present disclosure and is not intended to limit the present disclosure, and it will be apparent to those skilled in the art that various modifications and changes can be made to the present invention. Any modifications, equivalents, improvements, and etc. made within the spirit and principles of the present invention shall fall within the scope of the present invention.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An armrest box assembly for a vehicle, the armrest box assembly being disposed between two vehicle seats, the armrest box assembly comprising:
   an armrest box body comprising a first storage space having a first opening; and
   an armrest connected to the armrest box body, the armrest being movable relative to the armrest box body so as to open and close the first opening, the armrest comprising:
   an armrest body comprising a second storage space having a second opening; and
   a cover connected to the armrest body, the cover being movable relative to the armrest body so as to open and close the second opening;
   a motor for driving the armrest to move relative to the armrest box body; and
   a controller configured to activate the motor to move the armrest to a first open position and to a first closed position in response to receiving a signal, wherein the signal is sent to the controller in response to a camera within the vehicle detecting an image of an item carried by a front driver or a passenger and the vehicle reaching a destination or the vehicle parking, and wherein the controller is further configured to activate the motor to move the armrest to a first closed position after a certain period of time.

2. The armrest box assembly according to claim 1, wherein the armrest box body comprises a first side wall extending in a longitudinal direction of the vehicle, a second side wall opposite to the first side wall, a front wall adjacent to a front portion of the vehicle, and a rear wall opposite to the front wall, wherein one of the first and second side walls is provided with a guide rail, the armrest comprising a slider slidingly connected to the guide rail, and the armrest is slidable from a first closed position of the first opening toward a rear portion of the vehicle to expose the first opening until the armrest slides to the first open position.

3. The armrest box assembly according to claim 1, wherein the armrest box body comprises a first side wall extending in a longitudinal direction of the vehicle, a second side wall opposite to the first side wall, a front wall adjacent to a front portion of the vehicle, and a rear wall opposite to the front wall, the armrest box assembly further comprises a hinge structure, the hinge structure comprising a first hinge part connected to a rear wall of the armrest box body and a second hinge part connected to a rear portion of the armrest, wherein the armrest is pivotable between a first closed position and a first open position.

4. The armrest box assembly according to claim 1, wherein the armrest body comprises a first side wall, a second side wall opposite to the first side wall, a front wall connected to the first side wall and the second side wall, a rear wall connected to the first side wall and the second side wall and opposite to the front wall, and a bottom wall connected to the first side wall, the second side wall, the front wall, and the rear wall, the first side wall, the second side wall, the front wall, the rear wall, and the bottom wall collectively forming the second storage space.

5. The armrest box assembly according to claim 1 further comprising a switch connected to the motor, the motor driving the armrest to move when the switch is activated.

6. The armrest box assembly according to claim 1, wherein the signal is sent to the controller in response to a voice command given from the driver or the front passenger.

* * * * *